US007641021B2

(12) United States Patent
Behncke et al.

(10) Patent No.: US 7,641,021 B2
(45) Date of Patent: Jan. 5, 2010

(54) HAND-ACTUATED OPERATING DEVICE FOR AN OPERATOR'S CONTROL STATION OF AN INDUSTRIAL TRUCK

(75) Inventors: Christoph Behncke, Bad Segeberg (DE); Michael Niebuhr, Bargteheide (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 412 days.

(21) Appl. No.: 11/352,638

(22) Filed: Feb. 13, 2006

(65) Prior Publication Data

US 2006/0185938 A1 Aug. 24, 2006

(30) Foreign Application Priority Data

Feb. 19, 2005 (DE) ...................... 10 2005 007 789

(51) Int. Cl.
*B60K 23/00* (2006.01)

(52) U.S. Cl. ...................................................... 180/333

(58) Field of Classification Search .................. 180/333
See application file for complete search history.

(56) References Cited

U.S. PATENT DOCUMENTS 3,542,161 A * 11/1970 Ulinski ....................... 187/222
6,089,353 A * 7/2000 Bartels et al. ............... 187/224
7,278,509 B2 * 10/2007 Schroder et al. ............ 180/333
2002/0074179 A1 * 6/2002 Brandt et al. ............... 180/252
2005/0098375 A1 * 5/2005 David et al. ................. 180/333
2006/0191733 A1 * 8/2006 Paquin ........................ 180/333
2007/0199398 A1 * 8/2007 Ott et al. ................ 74/471 XY
2008/0023250 A1 * 1/2008 Hefner et al. ............... 180/332

FOREIGN PATENT DOCUMENTS

| | | |
|---|---|---|
| DE | 295 18 604 | 3/1996 |
| DE | 195 48 950 A1 | 7/1997 |
| DE | 297 14 284 | 11/1997 |
| WO | 00/64801 | 11/2000 |

* cited by examiner

*Primary Examiner*—Paul N Dickson
*Assistant Examiner*—Karen Jane J Amores
(74) *Attorney, Agent, or Firm*—Vidas, Arrett & Steinkraus, P.A.

(57) ABSTRACT

A hand-actuated operating device for an operator's control unit for an industrial truck, having a stationary, raised rest for the ball of the thumb that is disposed laterally beside and in front of the standing or sitting operator, including an upper support area on which the ball of the thumb of the operator's hand is adapted to be placed from top, a forward surface facing away from the operator and a surface facing the operator, wherein the forward and backward surfaces are dimensioned so to allow the support for the ball of the thumb to be gripped between the fingers and a proximal portion of the ball that faces the wrist, a portion located in front of the forward surface which is lowered with respect to the support area is disposed such as to allow the fingers of the hand resting on the support area to be placed at an angle, and at least one control element for a function of the industrial truck is disposed on the end of the lowered portion that is located opposite the support area so as to enable its actuation by at least one finger.

11 Claims, 3 Drawing Sheets

HAND-ACTUATED OPERATING DEVICE FOR AN OPERATOR'S CONTROL STATION OF AN INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

DE 297 14 284 U1 has made known a hand-actuated setting device for the operator's control station of a fork-lift reach truck in which three operating levers which are supported about an approximately horizontal axis and are arranged side by side in the direction of travel of the fork-lift truck are seated on a common shaft. Each operating lever has a lever head which can be gripped and actuated from above. The lower ends of the lever portions actuate hydraulic valves in such a way that the inner operating lever, which is disposed nearest to the driver, causes the load-carrying means to be raised and lowered whereas the middle one and the outer, farthest one cause the load-carrying means to move. The heads of the operating levers, as viewed from above, are located on a bent line such that if gripping changes over to another head an elbow supported on a rest will substantially maintain its position.

WO/00/64801 has made known an operating device for an industrial truck with a control element which can be grasped from above, using several fingers of a hand in order to move the element forwards or backwards in the direction of the fingers. The width of the control element is smaller than the width of the hand so that the little finger and, if needed, the ring finger or even more fingers of the hand can be supported on an area which is located next to the control element. The support area of the control element serves for actuating individual functions of the vehicle.

In the case mentioned last, there is a multi-function lever which is capable of realizing a multiplicity of functions. However, the operator can support his hand only insufficiently. Supporting is possible if there are single-function levers, but several functions cannot be carried out simultaneously. In both of the known instances, it is impossible for the operator to support himself, on one hand, while actuating a function, on the other.

It is the object of the invention to provide hand-actuated operating device for an operator's control unit of an industrial truck on which the operator can support himself and hold tight, on one hand, and is able to actuate various functions of the industrial truck, on the other, by using one or more fingers of the supporting hand.

BRIEF SUMMARY OF THE INVENTION

The inventive operating device includes a stationary, raised rest for the ball of the thumb that is suitably disposed on a holder laterally and slightly in front of the operator and is provided with an upper support area on which the ball of the thumb of the hand is adapted to be placed from top. The support area is limited in the direction of the fingers of the resting hand because the support area substantially serves for placing the ball of the thumb only. The limitation is predefined by a forward area and a backward area declining from the support area. According to the invention, a portion which is lowered with respect to the support area is disposed in order that the fingers of the hand resting on the support area may take an angled posture. This allows to bring the fingers, which are at an angle, to a relaxed position when the operator's hand rests on the support area. At the same time, it is possible for the operator to grip over the rest for the ball of the thumb to absorb dynamic forces originating from the travelling motion through the operator's firm grasp. At this stage, the fingers can lie against the forward area and the proximal portion of the ball of the thumb can be supported on the rearward area. According to the invention, at least one control element for a function of the industrial truck is disposed on the side of the lowered portion that is located opposite the support area so as to enable its actuation by at least one finger.

The inventive rest for the ball of the thumb allows to associate therewith a plurality of control elements for the various functions of an industrial truck, e.g. for a reverse of the direction of travel, the actuation of the horn, a proportional actuation of various hydraulic functions, etc. The invention achieves a hold-fast function which permits the operator to safely support himself when the driver is acted on by dynamic forces on the vehicle accordingly. If the control elements are not actuated a relaxed hand position with the fingers placed at a slight downward angle and, hence, at a relaxed position will become possible by the fact that the lowered portion is in front of the support area for the ball of the thumb. Furthermore, the support area is formed so as to adapt itself to different hand sizes.

According to an aspect of the invention, a plurality of adjacently arranged operating levers are provided. The levers preferably serve for actuating hydraulic functions and preferably generate analog control signals to achieve a proportional position of the respective hydraulic functions when the operating levers are swung out.

According to another aspect of the invention, at least one further control elements is laterally attached to the rest for the ball of the thumb so as to allow the element to be actuated by the thumb of the hand which rests on the support area. Preferably, the further control element is of an oblong shape in the thumb direction so that it may be actuated from different hand positions. The switching or control organs actuated by the control elements can function in a digital or analogue manner.

According to another aspect of the invention, the support area is wider than the lowered portion. The support area is so wide that the hand can be soundly placed thereon even if the hand size is at a maximum. Near the lowered portion, it is possible to arrange a further control element which can be actuated, for example, by the little finger or ring finger of the hand which rests on the support area.

According to another aspect of the invention, the support area is domed to be slightly convex to adapt it to the contour of the ball of the thumb. Towards the wrist, according to another aspect of the invention, the support area declines towards the base in a dome-like fashion in order to ensure sufficient support in the direction of the pressure acting onto the rest of the ball of the thumb.

According to another aspect of the invention, the support area on the thumb side extends into the interior of the region of the lowered portion. This allows for a tactile orientation by a lateral touch with the index finger (right hand) and a grasp at thumb-actuated control elements and a lateral support at any time.

Another aspect provides that the hand rest defines a common, self-contained functional unit. This allows to mount the inventive operating device on different apparatuses. A combination into a assembly unit also enables to efficiently safeguard it from environmental influences such as moisture and dirt. Moreover, it is possible to house the electronic equipment required for the control of the functional units, e.g. in the form of a printed circuit board, within the rest for the ball of the thumb that is configured in the shape of a shell body, for example.

BRIEF DESCRIPTION OF SEVERAL VIEWS OF THE DRAWINGS

The functional unit as a whole may simply be exchanged against other control elements or units.

The invention will be described in more detail below with reference to an embodiment shown in the drawings.

DETAILED DESCRIPTION OF THE INVENTION

Figure 1:
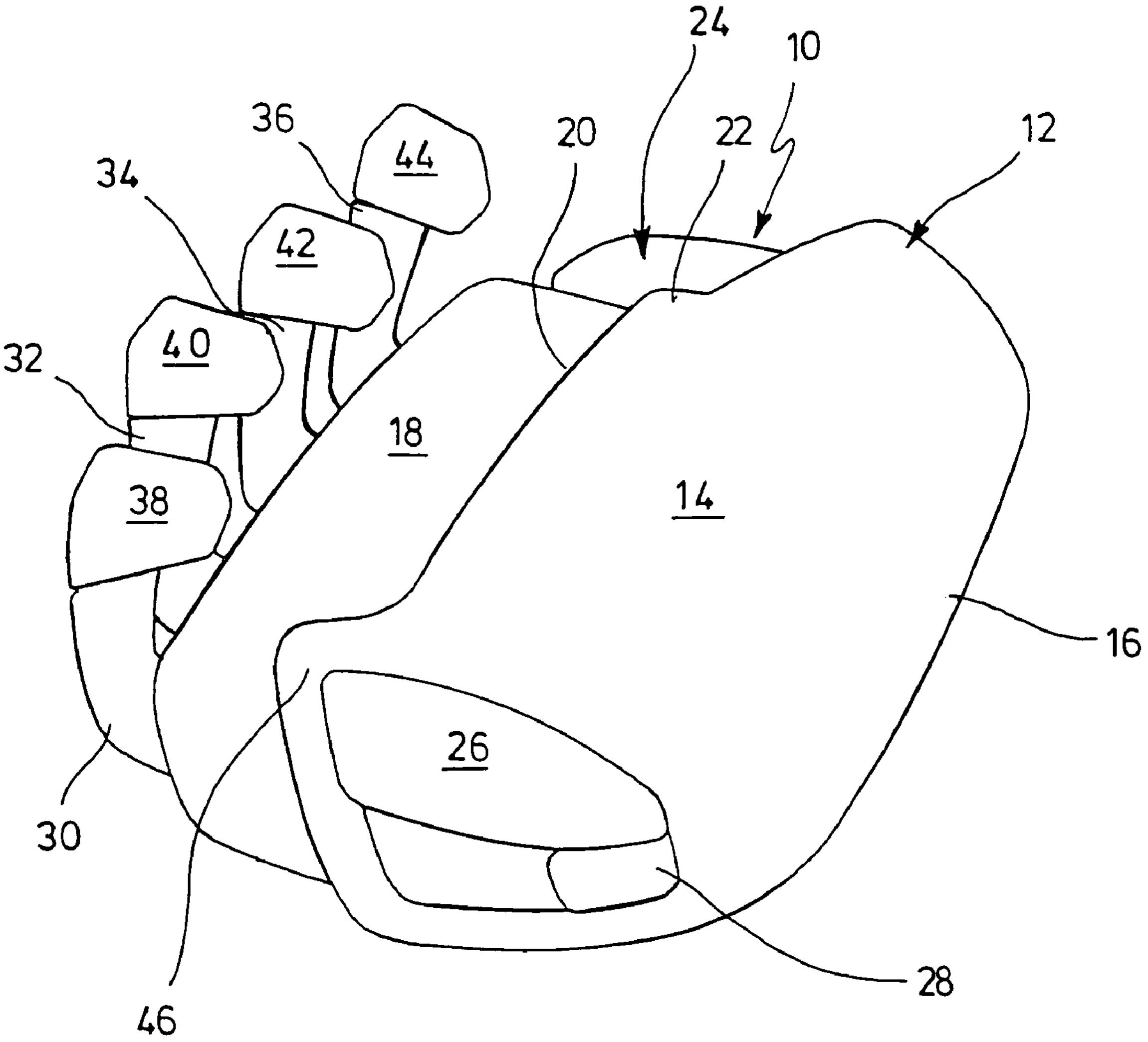
FIG. 1 shows a perspective view of an inventive operating device which is configured as a functional unit.

While this invention may be embodied in many different forms, there are described in detail herein a specific preferred embodiment of the invention. This description is an exemplification of the principles of the invention and is not intended to limit the invention to the particular embodiment illustrated Referring to FIG. 6, a counterweight fork-lift truck 50 is shown in a conventional construction. A seat 52 for the driver can be recognized in the cab and, on the right-hand side of the seat, an armrest 54 at the forward end of which a control unit 10 is mounted. During an actuation of the control unit 10, the lower arm may lie, but need not, on the armrest 54. More details of the control unit 10 are evident from FIGS. 1 through 5.

FIG. 1 illustrates more details of the control unit 10 which has a shell body 12 of a plastic material. The shell body 12 is arranged at an appropriate place in the control station of an industrial truck on a base (not shown), e.g. on the right-hand side next to the driver's place at a slightly elevated position, so that the driver may put his arm onto an armrest where the shell body is in front of the armrest. However, the latter is not a prerequisite. The following terms "at rear" and "at front", if applied, will refer to the operator who, using his right hand, actuates a control unit located at his right-hand side and in front thereof at an angle.

The shell body 12 has an upper support area 14 which, doming towards the rear, passes over into a rear area 16. Towards the front, the support area 14 is joined by a lower-positioned shoulder 18 with the passage from the support area 14 effected via a rounded edge 20. The shoulder 18 is smaller in width than is the support area 14 (also see FIGS. 2 through 5) with the edge 20 having a stand-back step 22 in the region of the right-hand end of the shoulder 18. Next to the shoulder 18 and at a position slightly lower or equally high as that of the shoulder 18, a control key 24 is arranged the width of which is such that it extends up to the right-hand side of the unit 10 (also see FIGS. 2 through 5).

On the left-hand side of the unit 10, an oblong control key 26 is countersunk in the shell body which as is evident from FIGS. 2 through 5 protrudes slightly beyond the remaining side areas of the unit 10. Below the oblong control key, another control key 28 is countersunk in the side of the unit 10, but is clearly shorter than is the control key 26. Intermediate switches, actuation rockers or the like may be provided in lieu of control keys 26 and 28. Their modes of action may be digital or analogue.

The front side of the shoulder 18 has hinged thereto four angled levers 30, 32, 34, and 36 side by side. The lower legs of the levers 30 to 36 extend to be approximately horizontal whereas the upper legs extend to be approximately vertical. The upper ends of the vertical legs have mounted or formed thereon heads 38, 40, 42, 44. The operating levers 30 through 36 are used to perform various hydraulic functions of the industrial truck, which is not shown, the actuated switches being analogue switches to obtain a proportional actuation in dependence on the swing of the levers 30 through 36. The control key 26 serves for reversing the direction of travel of the industrial truck in the present case and the control key 28 is provided for an extra function. The control key 24 also serves for actuating an extra function. The operating heads may be made of a soft and/or rough material to make them movable forwards and backwards by a finger. Moreover, the heads may have a contour which allows for their easy operation.

The heads 38 through 44 are disposed on an arc having a large radius and their distances are chosen so as to make possible their appropriate actuation by the fingers of the resting hand.

Figure 2:
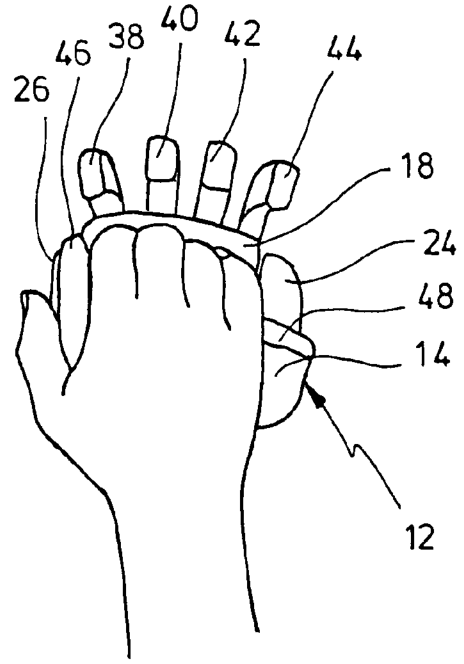
FIG. 2 shows the operating device of FIG. 1 with a hand placed thereon with no operation.

FIGS. 2 through 5 illustrate various positions of a hand which interacts with the control unit 10. FIG. 2 shows the way the ball of the thumb rest on the support area 14 while also abutting against the area 16 extending downwards in a dome. Therefore, forces which strive to move the body of the operator, who is not shown, to the front may be absorbed by a supporting action on the area 16. The fingers of the hand are at a downward angle and extend in the direction of the shoulder 18. Forces acting on the operator which strive to move the body to the rear can be absorbed by the operator by his gripping behind the area which declines towards the shoulder 18. For the rest, the hand may freely lie on the rest for the ball of the thumb and the thumb can casually lie laterally next to or above the control key 26, which is not compulsory, however, as can be appreciated from FIG. 5.

What becomes obvious from FIGS. 1 through 5 is that a portion of the support area 14 extends beside the shoulder 18. The portion is designated 46 in the Figures. In the representation of FIG. 2, the index finger laterally bears on this projection 46. It constitutes a tactile orientation for the operator.

Figure 3:
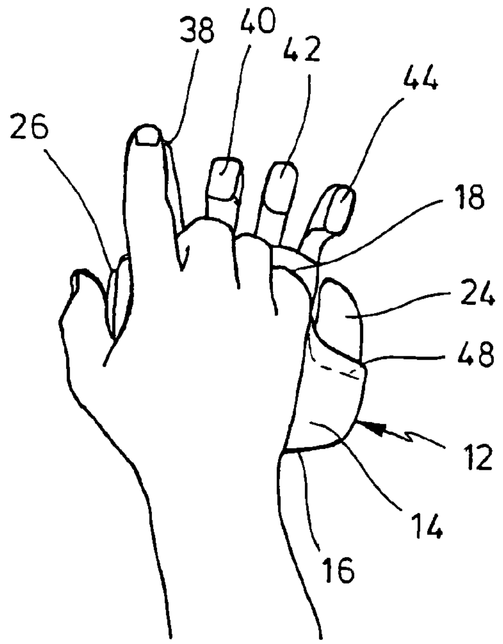
FIG. 3 shows a representation similar to FIG. 2 with an operating lever actuated in a first position of the hand.
Figure 4:
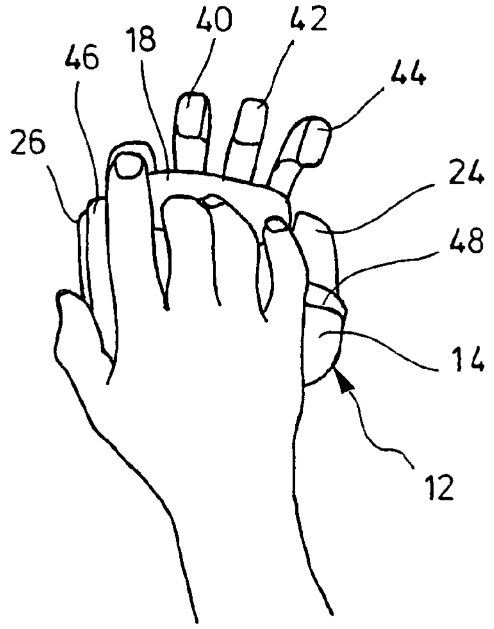
FIG. 4 shows a representation similar to FIG. 3, but with the hand in a different position.

FIG. 3 shows the way the index finger actuates the control key 38 and pushes the associated lever to the front. At the same time, the control key 26 is actuated by the thumb 26. The same actuation takes place in the representation of FIG. 4 where the hand, however, takes a somewhat more retracted position relative to FIG. 3. The shapes of the support area 14 and control unit and shell body 12 altogether are such as to allow the ball of the thumb to take different positions, but allow to actuate the described control keys notwithstanding this. This shape also allows for an adaptation to different hand sizes. The oblong shape of the control key 26 allows for an actuation, starting from different hand positions (FIG. 3 and FIG. 4).

Figure 5:
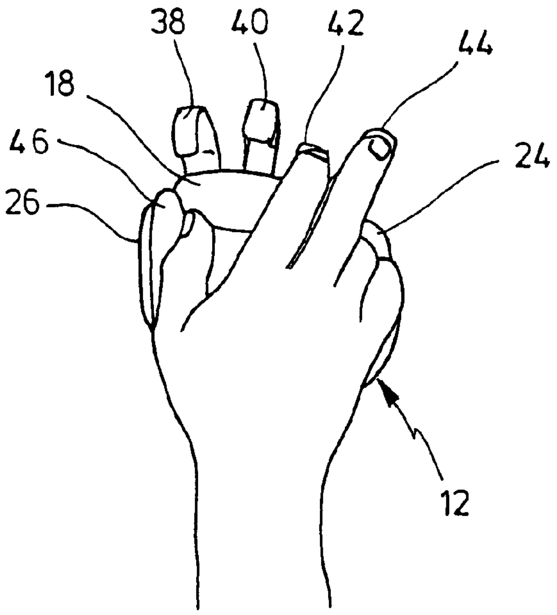
FIG. 5 shows how to actuate another operating lever in an arrangement of FIGS. 2 through 4.
Figure 6:
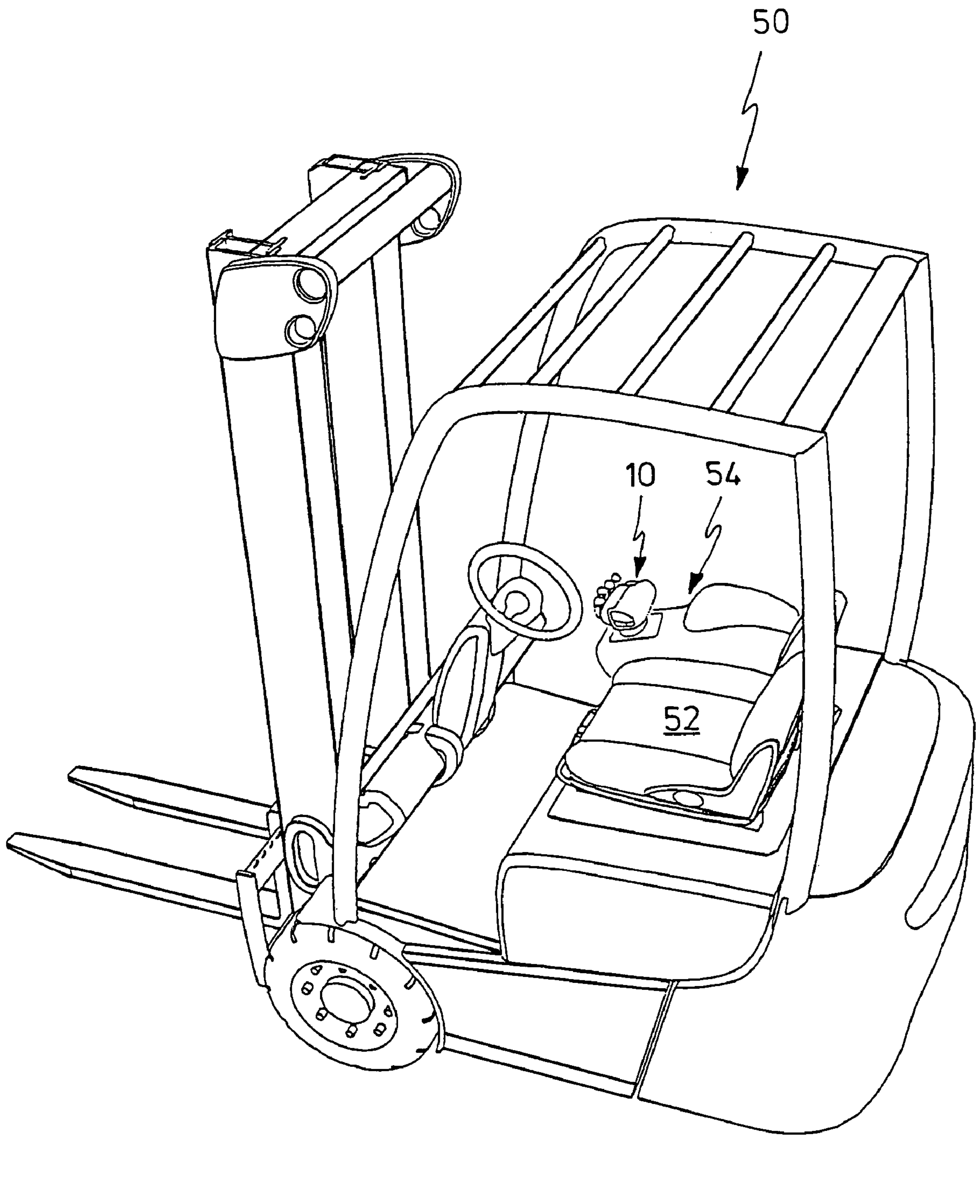
FIG. 6 shows a perspective view of a counterweight fork-lift truck including an operating device of FIGS. 1 through 5.

FIG. 5 shows the way the buttons 40 and 44 are actuated by the index finger and middle finger. At the same time, the control key 24 could be actuated by the little finger.

In FIGS. 2 through 5, a phantom line 48 can be recognized in the region of the support area 14. The line is to indicate that the shoulder area declining towards the shoulder 18 stands back to the rear in the lower region to offer an efficient possibility for a grasp by the fingers.

Switches and similar components which are actuated by the individual levers or keys are accommodated inside the shell body 12, e.g. on a common printed circuit board. It is preferred that the levers, rockers or the like which provide for a possible actuation in opposed directions be given a neutral position to which they are restored by a spring after they were swung.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A hand-actuated operating device for an operator's control station of an industrial truck, having a stationary, raised rest (12) for the ball of the thumb that is disposed laterally beside and in front of the operator, including an upper support area (14) on which the ball of the thumb of the operator's hand is adapted to be placed from top, a forward surface (20) facing away from the operator and a backward surface (16) facing the operator, wherein the forward and backward surfaces (16) are dimensioned so to allow the support for the ball of the thumb to be gripped between the fingers and a proximal portion of the ball, a portion (18), which is lowered with respect to the upper support area (14), and located in front of the forward surface and is disposed such as to allow the fingers of the hand resting on the support area (14) to be placed at an angle, and at least one control element for a function of the industrial truck is disposed on the end of the lowered portion (18) that is located opposite the support area (14) so as to enable its actuation by at least one finger, the support area (14), the lowered portion (18), the forward and rearward surfaces (20, 16) are formed by a body of a shell body (12), the at least one control element being laterally accommodated by the shell to allow the at least one control element to be actuated by the thumb of the hand which rests on the support area, the shell and the control elements define a common, self-contained functional unit (10) which accommodates switches adapted to be actuated by the control elements and the further accommodates other electric and electronic components for the control of the functions further characterized in that a plurality of adjacently arranged control elements (30 through 36) are provided and wherein the plurality of adjacently arranged control elements are disposed on an arc having a large radius, with their distances chosen so as to make their appropriate actuation by the fingers of the operator's hand.

2. The operating device as claimed in claim 1, characterized in that the at least one control element is comprised of control elements (30 through 36) which are substantially mounted to be movable forwards and backwards.

3. The operating device as claimed in claim 1, characterized in that at least one lateral control element (26) is of an oblong shape in the thumb direction.

4. The operating device as claimed in claim 1, characterized in that the support area (14) is wider than the lowered portion (18).

5. The operating device as claimed in claim 4, characterized in that a lateral control element (24) is disposed near the lowered portion (18) so as to enable the at least one control element to be preferably actuated by the little finger or ring finger of the hand which rests on the support area (14).

6. The operating device as claimed in claim 1, characterized in that the support area (14) is convex or cylindrically domed to adapt it to the contour of the ball of the thumb.

7. The operating device as claimed in claim 1, characterized in that the support area (14) passes over in a rounded shape into the rearward area on the side directed to the wrist of the resting hand.

8. The operating device as claimed in claim 1, characterized in that a portion of the support area (14) on the thumb side extends into the interior of the region of the lowered portion (18).

9. The operating device as claimed in claim 1, characterized in that the raised rest (12) for the ball of the thumb and the support area (14) are designed so as to enable the control elements to be actuated from different rest positions of the hand.

10. The operating device as claimed in claim 1, characterized in that the raised rest (12) for the ball of the thumb and the control elements define a common, self-contained functional unit (10).

11. The operating device as claimed in claim 1, characterized in that the shell body accommodates a printed circuit board for electronic components.

* * * * *